United States Patent [19]

Hilgraf et al.

[11] Patent Number: 4,529,337

[45] Date of Patent: Jul. 16, 1985

[54] DISTRIBUTION OF PARTICULATE MATERIAL

[75] Inventors: Peter Hilgraf, Hamburg; Ivan Somhegyi, Tremsbüttel, both of Fed. Rep. of Germany

[73] Assignee: Claudius Peters A.G., Hamburg, Fed. Rep. of Germany

[21] Appl. No.: 503,146

[22] PCT Filed: Oct. 1, 1982

[86] PCT No.: PCT/GB82/00281

§ 371 Date: May 31, 1983

§ 102(e) Date: May 31, 1983

[87] PCT Pub. No.: WO83/01247

PCT Pub. Date: Apr. 14, 1983

[30] Foreign Application Priority Data

Oct. 1, 1981 [GB] United Kingdom ................ 8129652

[51] Int. Cl.³ ............................................ B65G 69/04

[52] U.S. Cl. .................................. 406/163; 239/650; 239/518; 406/195; 414/293

[58] Field of Search ............... 406/157, 162, 163, 181, 406/195; 414/160, 205, 206, 293, 299, 301; 239/500, 518, 650

[56] References Cited

U.S. PATENT DOCUMENTS

| | | | |
|---|---|---|---|
| 1,802,059 | 4/1931 | Maciejski | 239/650 |
| 2,198,587 | 4/1940 | Skinner | 406/157 X |
| 2,209,842 | 7/1940 | Murray | 406/157 |
| 3,189,230 | 6/1965 | Gillespie | 406/181 X |
| 3,315,823 | 4/1967 | Rikoff | 414/301 |
| 3,563,476 | 2/1971 | Donelson, Jr. | 414/301 X |
| 4,272,028 | 6/1981 | Cobb | 406/162 X |
| 4,419,036 | 12/1983 | Beckenbach et al. | 414/160 |

FOREIGN PATENT DOCUMENTS

| | | | |
|---|---|---|---|
| 711757 | 7/1954 | United Kingdom | 406/162 |
| 2016901 | 10/1979 | United Kingdom . | |

*Primary Examiner*—Jeffrey V. Nase

*Attorney, Agent, or Firm*—Kemon & Estabrook

[57] ABSTRACT

An apparatus for distributing particulate material includes a feeder having a charging inlet and a discharge outlet duct having converging walls. Coaxially aligned with the discharge outlet duct is a deflector including a first spreader having diverging outer walls, and a second spreader contiguous with the diverging walls of the first spreader and having diverging walls of an angular inclination to the direction of flow of the particulate material greater than that of the first spreader. The charging inlet may have attached thereto an extension and an expansion chamber into which a feed pipe projects, the expansion chamber and the feed pipe being external to a receiving vessel. The particulate material may be fed into the feeder entrained in air. The material leaving the second spreader is uniformly distributed and may form a hollow curtain of uniformly distributed particulate material. The curtain may fall into a spray mixing vessel, and a circular baffle may contain the curtain. The baffle may carry fins and divide the curtain to pre-determined separate streams. The streams may be led away for use elsewhere, and streams may be formed at the discharge end of the second spreader rather than by the use of fins.

3 Claims, 1 Drawing Figure

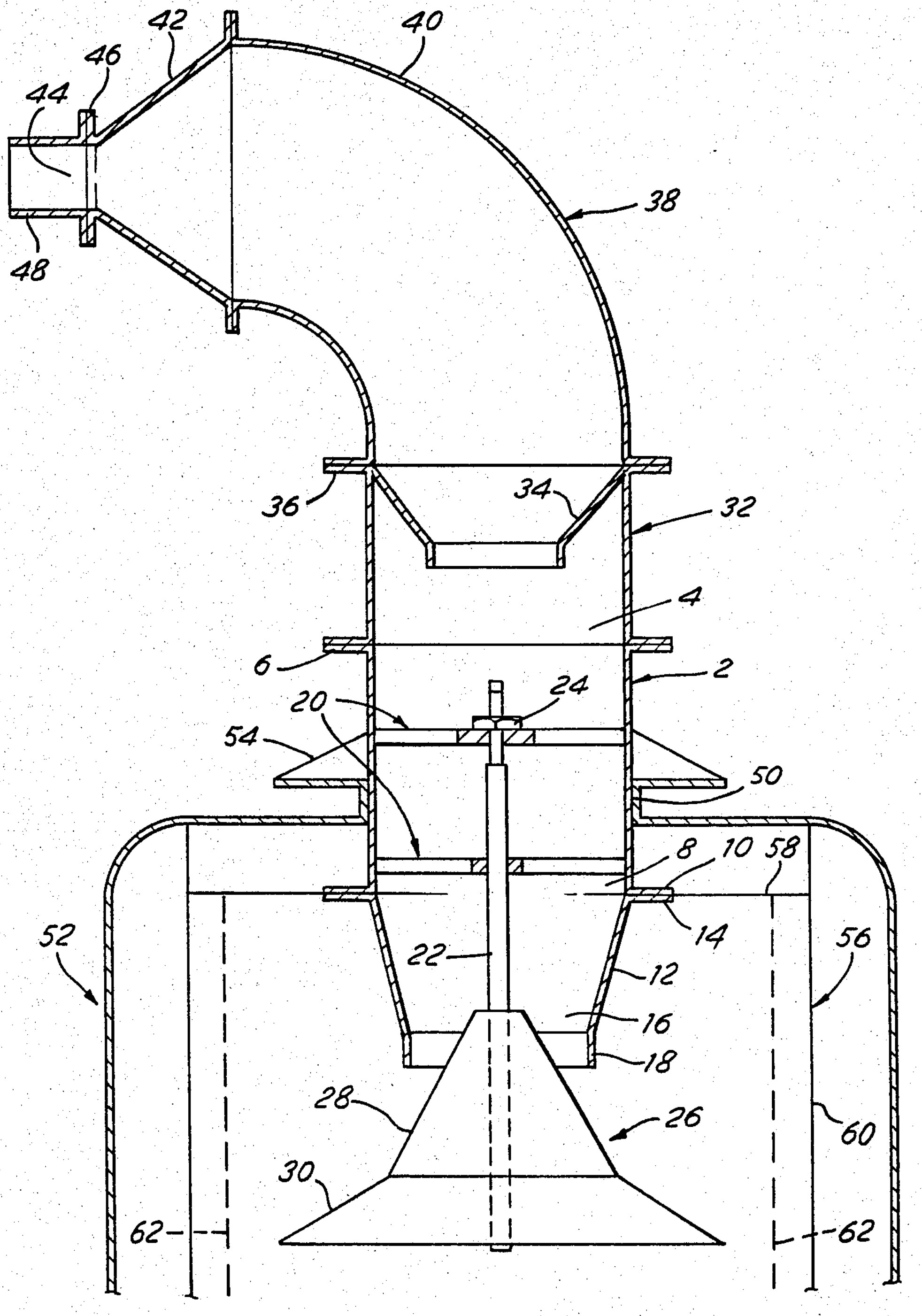
42
40
46
44
38
48
36
34
32
4
6
2
20
24
54
50
8
10
58
14
52
22
56
12
16
18
28
26
60
30
62
62

DISTRIBUTION OF PARTICULATE MATERIAL

DESCRIPTION

This invention relates to an apparatus for and a method of distributing particulate material. In one application of the invention the material is formed into a curtain that flows into a spray mixing vessel. In another the material may be divided into a number of separate streams.

According to the invention, there is provided an apparatus for distributing particulate material including an expansion chamber for receiving particulate material extrained in air and effecting a reduction in the speed of the air in which the particulate material is entrained, a feeder having a charging inlet which communicates with the expansion chamber and a discharge outlet duct, the discharge outlet duct having converging walls, a deflector to deflect particulate material received from the expansion chamber and the feeder, the deflector including a first conical spreader co-axially aligned with the discharge outlet duct and having walls which diverge away from the discharge outlet duct, a second conical spreader continguous with the diverging walls of the first conical spreader and having diverging walls of an angular inclination to the direction of flow of the particulate material greater than that of the first conical spreader so that, in use, the discharge of particulate material from the second conical spreader is in the form of a hollow cylindrical curtain of uniformly distributed particulate material.

According to the present invention, there is also provided an apparatus for distributing particulate material including an expansion chamber for receiving particulate material entrained in air and effecting a reduction in the speed of the air in which the particulate material is entrained, a feeder having a charging inlet which communicates with the expansion chamber and a discharge outlet duct, the discharge outlet duct having converging walls, a deflector to deflect particulate material received from the expansion chamber and the feeder, the deflector including a first conical spreader co-axially aligned with the discharge outlet duct and having walls which diverge away from the discharge outlet duct, a second conical spreader continguous with the diverging walls of the first conical spreader and having diverging walls of an angular inclination to the direction of flow of the particulate material greater than that of the first conical spreader so that, in use, the discharge of particulate material from the second conical spreader is in the form of a hollow cylindrical curtain of uniformly distributed particulate material which is received by baffle means that divides the material into streams in which the rates of flow have a predetermined relationship to each other.

According to the invention there is further provided a method of distributing particulate material including entraining the particulate material in air, reducing the speed of the flow of air in which the particulate material is entrained by passing the entrained particulate material through an expansion chamber, charging a feeder with the entrained particulate material, the feeder communication with the expansion chamber, discharging the particulate material from the feeder and directing the flow of particulate material onto a deflector so that a hollow cylindrical curtain of uniformly distributed particulate material is formed leaving the deflector.

The single FIGURE of the drawing is a vertical sectional view of a distributor for a particulate material.

The single FIGURE of the drawings in which an apparatus for distributing particulate material includes a cylindrical feeder 2 having an open top 4 forming a charging inlet, the periphery of which is surrounded by an external flange 6. Spaced apart from the charging inlet 4 and axially aligned therewith is a circular aperture 8 surrounded by an external peripheral flange 10, the aperture 8 communicating with an axially aligned discharge outlet duct 12 at a lower end portion of the feeder 2. The discharge outlet duct 12 is frusto-conical in shape having at an upper end portion thereof an external peripheral flange 14 which is attached to the external peripheral flange 10 of the circular aperture. Inner walls of the discharge outlet duct 12 converge and extend towards a lower circular outlet 16 from whose periphery extends a depending cylindrical rim 18.

Interposed between the charging inlet 4 and the discharge outlet duct 12 are a plurality of support members 20 each having spaced apart struts which radiate out from a central boss. Each boss is drilled to provide a bore which is aligned with a central axis of the feeder 2. The free ends of the struts are attached to the inner walls of the feeder 2.

A shaft 22 extends through the bores of each of the central bosses of the support members 20 such that the shaft 22 is axially aligned with the central axis of the feeder 2. The length of the shaft 22 is such that a lower end portion of the shaft projects beyond the lower circular outlet 16 of the discharge outlet duct 12 and such that an upper threaded end portion thereof extends beyond a support member 20 adjacent the charging inlet 4. The support member 20 adjacent the charging inlet 4 has a threaded bore and the threaded portion of the shaft 22 is mated with the threaded bore in the support member and secured by a lock nut 24. The length of the shaft 22 projecting beyond the lower circular outlet 16 may be altered by securing the upper end portion of the shaft 22, releasing the lock nut 24, adjusting the length of the shaft 22 projecting beyond the lower circular outlet 16, and then re-securing the lock nut 24.

Attached to the lower end portion of the shaft 22 is a deflector 26 having outer surfaces with diverge away from the discharge outlet duct 12. The deflector 26 includes a conical spreader, co-axially aligned with the discharge outlet duct 12, having an upper portion 28 projecting into the discharge outlet duct 12 so that an annular space exists between the outer surface of the spreader and the inner wall of the discharge outlet duct 12, and a lower portion 30 remote from the feeder 2. The lower portion 30 of the spreader has an angular inclination to the direction of flow of the particulate material greater than that of the upper portion of a greater radius thereto such that the lower portion 30 is flared with respect to the upper portion 28.

Connected to the peripheral flange 6 surrounding the charging inlet 4 of the feeder 2 is a cylindrical extension 32 having at an upper end portion thereof remote from the charging inlet 4 a circular inlet 34. The circular inlet 34 is frusto-conical in shape having at an upper portion thereof an external peripheral flange 36. Inner walls of the circular inlet 34 converge to form an inlet axially aligned with the charging inlet 4 and the discharge outlet duct 12.

Attached to the peripheral flange 36 surrounding the circular inlet 34 of the extension 32 is an expansion chamber 38 having a substantially cylindrical shape with which is bent to form a 90° bend. The expansion chamber 38 includes a lower cylindrical portion 40 of a similar diameter to that of the extension 32 and feeder 2, and an upper frusto-conical portion 42 whose internal diameter decreases progressively from the lower portion 40 toward an inlet 44 remote from the lower portion 40. The periphery of the inlet is surrounded by an external flange 46.

Attached to the external flange 46 of the inlet 44 of the expansion chamber 38 is a feed pipe 48.

The feeder 2 and associated deflector 26 are inserted into an aperture 50 in an upper portion of a vessel 52 such that the deflector 26 and discharge outlet duct 12 project into the vessel 52 and such that the charging inlet 4 of the feeder 2 is external to the vessel 52. A portion of the feeder 2 adjacent the aperture 50 in the upper portion of the vessel 52 is strengthened by webs 54 which extend from the external walls of the feeder and are attached to an outer surface of the vessel 52.

Attached to an upper inner surface of the vessel 52 and to the peripheral flange 14 of the discharge outlet duct 12 is a baffle 56 in the form of a plate 58 having a depending cylindrical skirt 60 which surrounds and is spaced apart from the deflector 26 and the discharge outlet duct 12.

In operation, particulate material entrained in air is fed into the feed pipe 48 where on entry into the expansion chamber 38 the particulate material is directed by the shape of the upper portion 42 onto the inner walls of the lower portion 40 where a reduction in the speed of flow of the air in which the particulate material is entrained takes place.

The particulate material is then pneumatically conveyed into the circular inlet 34 of the extension 32 where due to the shape of the circular inlet 34 the particulate material is channelled away from the inner walls and caused to flow in a uniformly distributed stream adjacent the central axis of the extension 32.

The stream of uniformly distributed particulate material enters the charging inlet 4 of the feeder 2, flows past the support members 20 and the shaft 22 towards the discharge outlet duct 12 where due to the shape of the inner walls of the discharge outlet duct 12 the particulate material from the inner walls of the feeder, deflected by impinging on the support members 20 and the shaft 22, is channelled away and formed into a stream of uniformly distributed particulate material. The stream is then conveyed onto the upper portion 28 of the spreader where on impinging on the outer surface thereof the stream is directed radially outwardly then further spread out by impinging upon the lower portion of the spreader. The material leaving the portion 30 is uniformly distributed and, impinging on the cylindrical skirt 60, will constitute an annular curtain of uniformly distributed particulate material.

The dimensions of the curtain, particularly the diameter thereof, may be altered firstly by adjusting the position of the deflector 26 in relation to the discharge outlet duct 12 of the feeder for alteration of the internal diameter, and secondly by altering the radius of the cylindrical skirt 60 for alteration of the external diameter. Additionally the dimensions of the curtain may be altered by altering the velocity of the air in which the particulate material is conveyed.

It should also be appreciated that the feed pipe 48 may be fed directly into the charging inlet 4 of the feeder 2.

It should also be appreciated that the particulate material may be fed into the apparatus without being entrained in air.

It should further be appreciated that the upper portion 28 and the lower portion 30 of the conical spreader may be constructed from separate castings and be connected together such that the outer surfaces of the lower portion 30 is contiguous with the outer surface of the upper portion 28.

The vessel 52 may be a spray mixing vessel in which the material in the uniform curtain will be mixed with a liquid.

Since the material leaving the lower portion 30 is uniformly distributed, that may serve as the source of a plurality of streams of particulate material having a pre-determined ratio of rates of flow. For instance, to divide the material leaving the portion 30 into eight equal streams, the inner surface of the skirt 60 may be provided with eight similar, radially extending and equiangularly spaced fins, of which two are indicated in broken lines at 62. There will be equal rates of flow between each two adjacent pairs of fins and the material may be led away from the bottom of the pair of fins to a point of use. It is envisaged that the particulate material may be fuel, so that eight burners could be equally supplied from a single source of fuel.

As an alternative, material leaving the portion 30 may discharge directly into the inlet ends of ducts through which it passes to the points of use. The portion 30 might be provided with a downward extension that is provided with grooves that lead to the inlet ends of the ducts.

The material leaving the portion 30 may be divided not only a number of equal parts but into parts of different sizes having a pre-determined relation to each other.

We claim:

1. An apparatus for distributing entrained particulate material including an expansion chamber for receiving particulate material entrained in air and effecting a reduction in the speed of the air in which the particulate material is entrained, a means for channeling the entrained particulate material, having converging walls, which communicates with the expansion chamber to produce a flow of uniform distribution, a mixing vessel, a feeder located in the mixing vessel and having a charging inlet which communicates with the channelling means and receives particulate material having a flow of uniform distribution therefrom and a discharge outlet duct, the discharge outlet duct having converging walls, a deflector to deflect particulate material received from the feeder, the deflector including a first conical spreader co-axially aligned within the discharge outlet duct of the feeder and having walls which diverge away from the discharge outlet duct, a second conical spreader continguous with the diverging walls of the first concial spreader and having diverging walls of an angular inclination to the direction of flow of the particulate material greater than that of the first conical spreader, and a circular baffle positioned within the mixing vessel and spaced apart from and surrounding the first and second spreaders so that, in use, the discharge of particulate material from the second conical spreader is in the form of a hollow cylindrical curtain of uniformly distributed particulate material.

2. An apparatus for distributing entrained particulate material including an expansion chamber for receiving particulate material entrained in air and effecting a reduction in the speed of the air in which the particulate material is entrained, a means for channelling the entrained particulate material, having converging walls, which communicates with the expansion chamber to produce a flow of uniform distribution, a mixing vessel, a feeder located in the mixing vessel and having a charging inlet which communicates with the channelling means and receives particulate material therefrom having a flow of uniform distribution and a discharge outlet duct, the discharge oulet duct having converging walls, a deflector to deflect particulate material received from the feeder, the deflector including a first conical spreader co-axially aligned within the discharge outlet duct of the feeder and having walls which diverge away from the discharge outlet duct, a second conical spreader continguous with the diverging walls of the first conical spreader and having diverging walls of an angular inclination to the direction of flow of the particulate material greater than that of the first conical spreader and a circular baffle means provided with a plurality of radically inwardly, projecting fins which baffle means is positioned within the mixing vessel and spaced apart from and surrounding the first and second conical spreaders so that, in use, the discharge of particulate material from the second conical spreader is in the form of a hollow cylindrical curtain of uniformly distributed particulate material which is received by the baffle means such that the material is divided into streams in which the rates of flow have a predetermined relationship to each other.

3. A method of distributing entrained particulate material including entraining the particulate material in air, reducing the speed of the flow of air in which the particulate material is entrained by passing the entrained particulate material through an expansion chamber, channelling the entrained particulate material through a convergent duct prior to charging into a feeder to produce a flow of uniform distribution into the feeder, charging the feeder with the flow of uniformly distributed entrained particulate material, the feeder being positioned within a mixing vessel, discharging particulate material from the feeder, controlling the discharge of particulate material from the feeder, directing the flow of particulate material onto a deflector so that a hollow cylindrical curtain of uniformly distributed particulate material is formed leaving the deflector, and limiting the diameter of the hollow cylindrical curtain leaving the deflector by positioning a circular baffle within the mixing vessel spaced apart from and surrounding the deflector.

* * * * *